US011618334B2

(12) United States Patent
Abe et al.

(10) Patent No.: US 11,618,334 B2
(45) Date of Patent: Apr. 4, 2023

(54) SOLAR POWER GENERATION CONTROL DEVICE

(71) Applicant: HONDA MOTOR CO., LTD., Tokyo (JP)

(72) Inventors: Noriyuki Abe, Saitama (JP); Yoshio Kojima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 17/203,043

(22) Filed: Mar. 16, 2021

(65) Prior Publication Data

US 2021/0291686 A1 Sep. 23, 2021

(30) Foreign Application Priority Data

Mar. 19, 2020 (JP) .............................. JP2020-050281

(51) Int. Cl.
*B60L 53/51* (2019.01)
*B60L 53/60* (2019.01)
*H02J 7/35* (2006.01)

(52) U.S. Cl.
CPC ............... *B60L 53/51* (2019.02); *B60L 53/60* (2019.02); *H02J 7/35* (2013.01)

(58) Field of Classification Search
CPC .......... B60L 53/51; B60L 53/60; B60L 8/003; H02J 7/35; H02J 7/007188; H02J 2310/48; H02S 50/15; H02S 10/40; Y02E 10/50; Y02E 10/70; Y02E 10/7072; Y02E 70/30; Y02E 90/12
See application file for complete search history.

(56) References Cited

U.S. PATENT DOCUMENTS

| | | | |
|---|---|---|---|
| 2016/0172524 A1* | 6/2016 | Erlbacher | ................. G01J 1/42 257/77 |
| 2018/0180469 A1* | 6/2018 | Gabriel | ................. G01J 1/4204 |
| 2018/0343303 A1* | 11/2018 | Dudar | ..................... H01L 31/04 |
| 2020/0130525 A1* | 4/2020 | Son | .......................... H02J 7/35 |

FOREIGN PATENT DOCUMENTS

| | | | |
|---|---|---|---|
| JP | 2015-085707 A | | 5/2015 |
| WO | WO 2015/063556 A1 | | 5/2015 |

* cited by examiner

*Primary Examiner* — Richard Isla
*Assistant Examiner* — Johali A Torres Ruiz
(74) *Attorney, Agent, or Firm* — Paratus Law Group, PLLC

(57) ABSTRACT

A solar power generation control device, controlling a solar power generation system configured to charge a power storage device of a vehicle with electric power generated by a solar cell provided in the vehicle, includes: a determination unit configured to determine whether irradiation light to the vehicle is sunlight based on an output of an optical sensor; and a control unit configured to control an operation mode of the solar power generation system, including a first mode, in which the power storage device is charged with electric power generated by the solar cell, and a second mode, in which power consumption of the solar power generation system is lower than in the first mode, based on a determination result of the determination unit. The control unit sets the solar power generation system to the first mode when the determination unit determines that the irradiation light is sunlight.

6 Claims, 4 Drawing Sheets

SOLAR POWER GENERATION CONTROL DEVICE

CROSS-REFERENCE TO RELATED APPLICATIONS

The present application claims the benefit of priority of Japanese Patent Application No. 2020-050281, filed on Mar. 19, 2020, the content of which is incorporated herein by reference.

TECHNICAL FIELD

The present invention relates to a solar power generation control device that controls a solar power generation system.

BACKGROUND ART

In the related art, there is a solar power generation system that includes a solar cell and a power storage device, and charges the power storage device with electric power generated by the solar cell. Generally, such a solar power generation system is started when irradiation light to the solar cell is detected (specifically, when an output voltage of the solar cell is larger than a predetermined voltage value), and performs charging of the power storage device with the electric power generated by the solar cell. JP-A-2015-85707 discloses that such a solar power generation system is provided in a vehicle.

If it is set to start the solar power generation system when there is irradiation light to the solar cell, it may occur that the solar power generation system is started resulting in an increase in power consumption even in a situation where sufficient generated electric power cannot be expected, and there is room for improvement in this respect.

SUMMARY

The present invention provides a solar power generation control device capable of appropriately charging a power storage device with electric power generated by a solar cell while reducing power consumption of the solar power generation system.

According to an aspect of the present invention, there is provided a solar power generation control device, controlling a solar power generation system configured to charge a power storage device of a vehicle with electric power generated by a solar cell provided in the vehicle, an operation mode of the solar power generation system including: a first mode in which the power storage device is charged with electric power generated by the solar cell; and a second mode in which power consumption of the solar power generation system is lower than in the first mode, the solar power generation control device including: a determination unit configured to determine whether irradiation light to the vehicle is sunlight based on an output of an optical sensor provided in the vehicle; and a control unit configured to control the operation mode of the solar power generation system based on a determination result of the determination unit, where the control unit sets the solar power generation system to the first mode when the determination unit determines that the irradiation light is sunlight.

According to the aspect of the present invention, it is possible to appropriately charge the power storage device with the electric power generated by the solar cell while reducing the power consumption of the solar power generation system.

DESCRIPTION OF EMBODIMENTS

Figure 1:
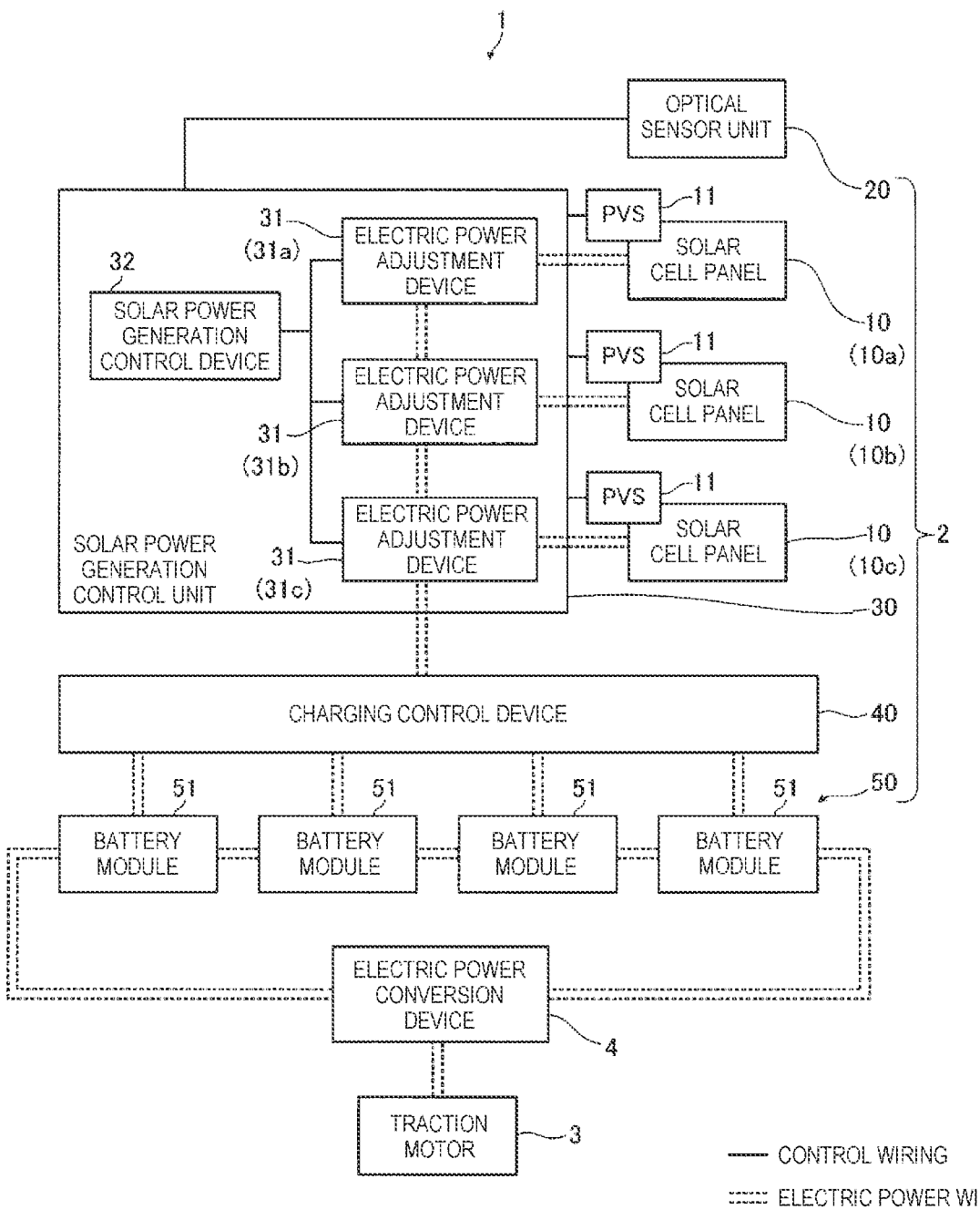
FIG. 1 is a diagram illustrating an example of a vehicle provided with a solar power generation system controlled by a solar power generation control device according to an embodiment of the present invention.

Hereinafter, an embodiment of a solar power generation control device according to the present invention will be described in detail with reference to the drawings. In the following description, front-rear, left-right, and up-down are described according to directions viewed from a user of the vehicle. In the drawings, a front side of the vehicle is indicated as Fr, a rear side as Rr, a left side as L, a right side as R, an upper side as U, and a lower side as D.

First, a vehicle provided with a solar power generation system controlled by a solar power generation control device according to an embodiment of the present invention will be described with reference to FIG. 1. In FIG. 1, a solid line indicates a control wiring, and a double dotted line indicates an electric power wiring.

As illustrated in FIG. 1, a vehicle 1 includes a solar power generation system 2 capable of generating power using irradiation light to the vehicle 1 (hereinafter, also simply referred to as irradiation light), and a traction motor 3 (for example, a three-phase AC motor) that drives by using electric power generated by the solar power generation system 2. The vehicle 1 is an electric vehicle that can run under motive power of the traction motor 3.

Sunlight and artificial light may be the irradiation light. The sunlight is light having the sun as a light source, and the artificial light is light having an artificial object as a light source such as a light emitting diode (LED) or an incandescent lamp. The artificial light is, for example, light emitted by another vehicle around the vehicle 1 (for example, light of a headlight of an oncoming vehicle), light of a street lamp around the vehicle 1 (for example, light of a road illumination lamp provided on a road on which the vehicle 1 runs), and the like. In a case where the irradiation light is artificial light, an irradiation state thereof (for example, the intensity) tends to change easily within a short time period, as compared with a case where the irradiation light is sunlight.

As illustrated in FIG. 1, the solar power generation system 2 includes a solar cell panel 10, an optical sensor unit 20, a solar power generation control unit 30, a charging control device 40, and a battery 50.

The solar cell panel 10 is an example of a solar cell in the present invention. The solar cell panel 10 is configured with, for example, a plurality of solar cells connected in series that convert light energy into electric power, and outputs electric power generated by the plurality of solar cells in the irradiation light to the solar power generation control unit 30. In the vehicle 1, a plurality of such solar cell panels 10 are provided, and each of the plurality of solar cell panels 10 is connected to the solar power generation control unit 30.

Specifically, the solar cell panel 10 includes a solar cell panel 10a, a solar cell panel 10b, and a solar cell panel 10c. The solar cell panel 10a, the solar cell panel 10b, and the solar cell panel 10c are arranged on different surfaces of a vehicle body. An example of arrangement positions of the solar cell panel 10a, the solar cell panel 10b, and the solar cell panel 10c will be described later with reference to FIG. 2.

Although an example in which three solar cell panels 10 of the solar cell panel 10a, the solar cell panel 10b, and the solar cell panel 10c are provided is described in the present embodiment, the present invention is not limited thereto. For example, one or two solar cell panels 10 may be provided, or four or more solar cell panels 10 may be provided.

Further, a solar cell sensor unit (illustrated as PVS in FIG. 1) 11 is provided so as to correspond to each solar cell panel 10. The solar cell sensor unit 11 detects an output of the corresponding solar cell panel 10, and sends a detection signal including both a detection result and an identifier (that is, ID) of the solar cell sensor unit 11 to the solar power generation control unit 30. The solar cell sensor unit 11 detects an output voltage or an output current of the solar cell panel 10 as an output of the solar cell panel 10. Accordingly, the solar power generation control unit 30 (for example, a solar power generation control device 32 to be described later) can acquire information indicating the output voltage or the output current for each solar cell panel 10 based on the detection signal from each solar cell unit 11.

The optical sensor unit 20 includes an optical sensor such as a photodiode that converts light energy into electric power, and is configured to be capable of detecting an intensity of the irradiation light (for example, a light amount of the irradiation light) by the optical sensor. In addition, the optical sensor unit 20 transmits a detection signal including information indicating the detected intensity of the irradiation light to the solar power generation control unit 30. When there is no irradiation light, for example, the optical sensor unit 20 transmits a detection signal indicating that the intensity of the irradiation light is "0" to the solar power generation control unit 30. Thus, the solar power generation control unit 30 (for example, the solar power generation control device 32 to be described later) can acquire information indicating presence or absence of the irradiation light and the intensity of the irradiation light based on the detection signal from the optical sensor unit 20.

Further, the optical sensor unit 20 is configured to be capable of detecting a spectrum of the irradiation light. Specifically, for example, the optical sensor unit 20 divides the irradiation light into light for each predetermined wavelength band, and detects an intensity of the light in each wavelength band. Further, the optical sensor unit 20 transmits a detection signal including information indicating a detected spectrum of the irradiation light (for example, the intensity of the light in each wavelength band) to the solar power generation control unit 30. Thus, the solar power generation control unit 30 (for example, the solar power generation control device 32 to be described later) can acquire information indicating the spectrum of the irradiation light based on the detection signal from the optical sensor unit 20.

In the present embodiment, an example in which the optical sensor unit 20 is provided separately from the solar cell panel 10 is described, but the present invention is not limited thereto. For example, one of the solar cell panels 10 or each solar cell panel 10 may be used as a substitute for the optical sensor unit 20. In this case, the solar cell panel 10 used as a substitute for the optical sensor unit 20 is configured to have the same function as the optical sensor unit 20.

The solar power generation control unit 30 includes an electric power adjustment device 31 and the solar power generation control device 32. A plurality of electric power adjustment devices 31 are provided so as to correspond to the respective solar cell panels 10. Specifically, in the present embodiment, an electric power adjustment device 31a is provided corresponding to the solar cell panel 10a. An electric power adjustment device 31b is provided corresponding to the solar cell panel 10b. An electric power adjustment device 31c is provided corresponding to the solar cell panel 10c.

Each electric power adjustment device 31 receives electric power generated by the corresponding solar cell panel 10, and outputs the received electric power to the charging control device 40. The electric power adjustment device 31 may directly output the electric power generated by the corresponding solar cell panel 10 to the charging control device 40, or may output the electric power to the charging control device 40 via another electric power adjustment device 31.

Each electric power adjustment device 31 controls the electric power generated by the corresponding solar cell panel 10. Specifically, each electric power adjustment device 31 performs maximum power point tracking control (hereinafter, also referred to as MPPT control) so that the electric power generated by the corresponding solar cell panel 10 is maximized. The electric power adjustment device 31 can be implemented by a so-called micro-converter having a function of performing MPPT control, for example.

The solar power generation control device 32 is an example of the solar power generation control device of the present invention. For example, the solar power generation control device 32 determines whether the irradiation light is sunlight based on the output of the solar cell panel 10 or the optical sensor unit 20, and controls the operation mode of the solar power generation system 2.

In the present embodiment, the solar power generation system 2 may adopt a startup mode and a pause mode (sleep mode) in which power consumption of the solar power generation system 2 is less than in the startup mode. Specifically, the startup mode is an operation mode in which the battery 50 is charged with the electric power generated by the solar cell panel 10. On the other hand, the pause mode is an operation mode in which the battery 50 is not charged with the electric power generated by the solar cell panel 10.

For example, in the pause mode, the electric power adjustment device 31 disables other functions (for example, a function of performing MPPT control) except a function of communication with the solar power generation control device 32. Accordingly, since power consumption of the electric power adjustment device 31 is reduced in the pause mode, power consumption of the entire solar power generation system 2 is reduced. Further, in the pause mode, not only the electric power adjustment device 31 but also other components (for example, the charging control device 40) may disable a function serving for charging the battery 50 as appropriate. A configuration example of the solar power generation control device 32 will be described later with reference to FIG. 3.

The charging control device 40 receives the electric power generated by the solar cell panel 10 via the solar power generation control unit 30, and charges the battery 50 with the received electric power. The battery 50 is an example of a power storage device in the present invention, and is configured with a plurality of battery modules 51 connected in series. Each of the plurality of battery modules 51 is connected to the charging control device 40, and the charging control device 40 can selectively charge each of the battery modules 51.

For example, the charging control device 40 distributes electric power to the battery modules 51 and charges the battery modules 51 so that remaining capacities of the battery modules 51 are equal. The charging control device 40 can be implemented with a predetermined integrated circuit, for example. The electric power of the battery 50 is supplied to the traction motor 3 via an electric power conversion device 4 that converts a direct current into an alternating current. The electric power conversion device 4 can be implemented with an inverter device, for example.

Figure 2:
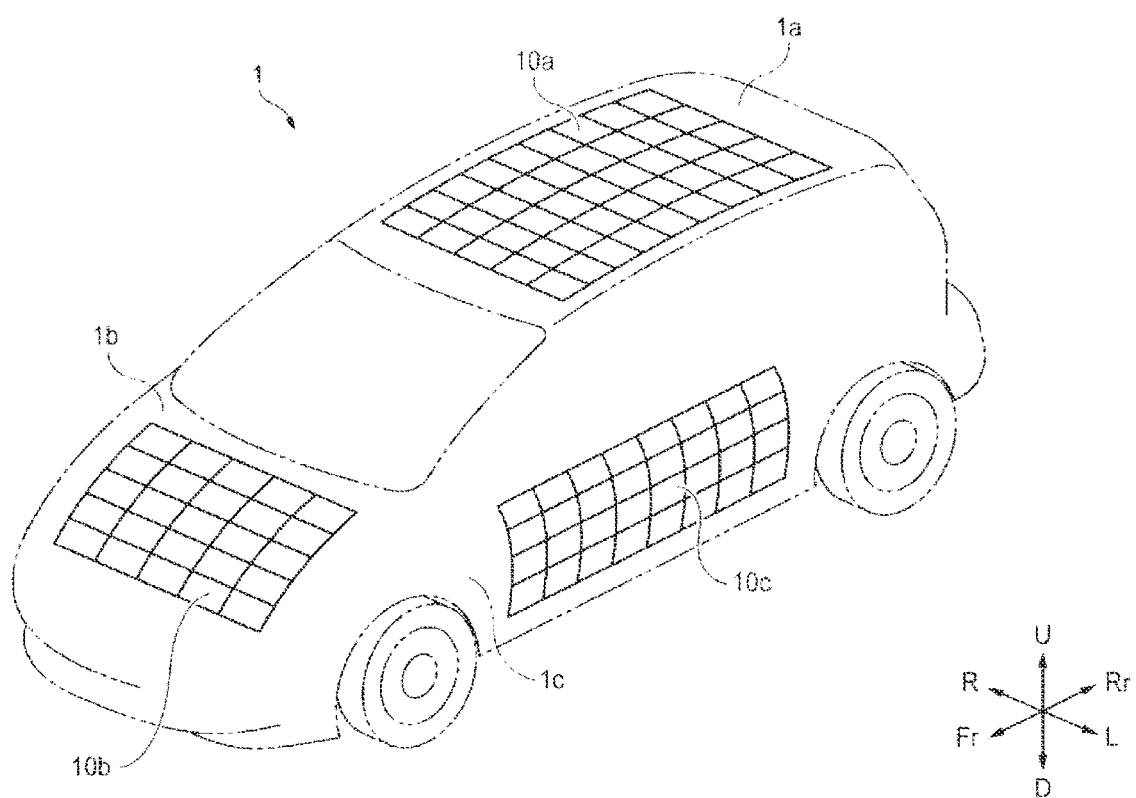
FIG. 2 is a diagram illustrating an example of an arrangement position of each solar cell panel.

Next, an example of an arrangement position of each solar cell panel 10 will be described with reference to FIG. 2. As illustrated in FIG. 2, the solar cell panel 10a is arranged at a roof portion 1a of the vehicle 1 with a light receiving portion thereof capable of receiving the irradiation light facing upward. The solar cell panel 10b is arranged at a hood portion 1b of the vehicle 1 with a light receiving portion thereof capable of receiving the irradiation light facing upward. The solar cell panel 10c is arranged at a left side portion 1c (for example, a left side door) of the vehicle 1 with a light receiving portion thereof capable of receiving the irradiation light facing leftward.

In this manner, the solar cell panel 10a, the solar cell panel 10b, and the solar cell panel 10c are arranged at different positions of the vehicle 1. In particular, the solar cell panel 10a is arranged on an upper side of the solar cell panel 10b and the solar cell panel 10c. As described above, in the solar power generation system 2, four or more solar cell panels 10 may be provided, and, for example, similarly to the left side portion 1c of the vehicle 1, a right side portion (for example, a right side door) of the vehicle 1 may be provided with the solar cell panel 10. Although not illustrated and a detailed description is omitted, for example, similarly to the solar cell panel 10a, the optical sensor of the optical sensor unit 20 is arranged at the roof portion 1a of the vehicle 1 with a light receiving portion thereof capable of receiving the irradiation light facing upward.

Figure 3:
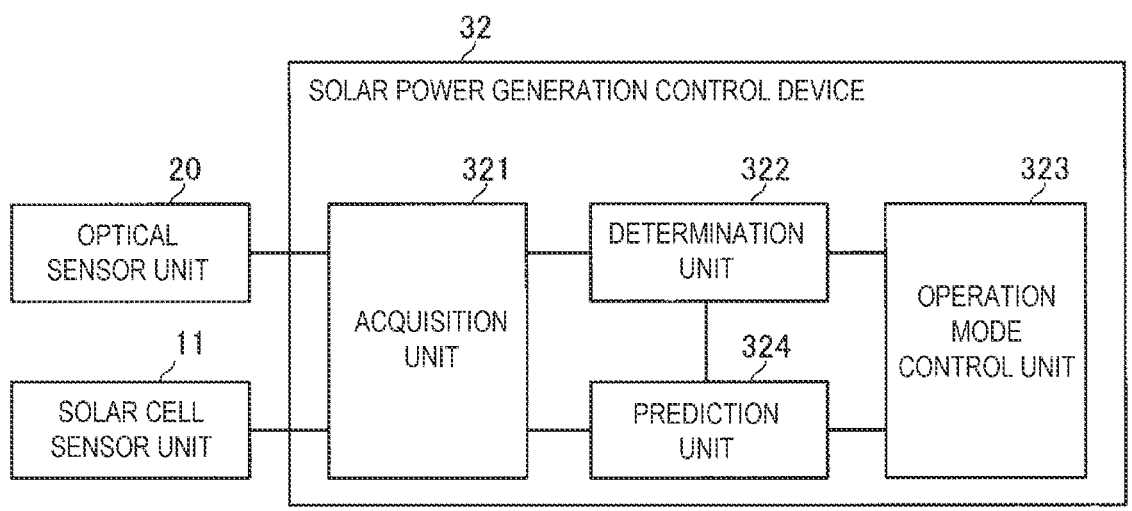
FIG. 3 is a block diagram illustrating a functional configuration example of the solar power generation control device of the present embodiment.

Next, an example of a functional configuration of the solar power generation control device 32 will be described with reference to FIG. 3. As illustrated in FIG. 3, the solar power generation control device 32 includes an acquisition unit 321, a determination unit 322, and an operation mode control unit 323.

The acquisition unit 321 acquires information for specifying characteristics of the irradiation light based on an output of the optical sensor provided in the vehicle 1. Here, the optical sensor provided in the vehicle 1 is, for example, each of the solar cell panels 10 or the optical sensor unit 20. For example, the acquisition unit 321 acquires information indicating an intensity of the irradiation light as the information for specifying the characteristics of the irradiation light.

The determination unit 322 determines whether the irradiation light is sunlight, based on the information for specifying the characteristics of the irradiation light acquired by the acquisition unit 321 in accordance with the output of the optical sensor provided in the vehicle 1. For example, as described above, it is assumed that the acquisition unit 321 acquires the information indicating the intensity of the irradiation light as the information for specifying the characteristics of the irradiation light. In this case, when an amount of change in the intensity of the irradiation light in a predetermined period is smaller than a predetermined threshold, the determination unit 322 determines that the irradiation light is sunlight.

That is, if the irradiation light is sunlight, there is a high possibility that the vehicle 1 is irradiated with light of a certain intensity for a certain period. In other words, when the intensity of the irradiation light fluctuates greatly within a short time, there is a high possibility that the irradiation light is artificial light. Accordingly, when the amount of change in the intensity of the irradiation light in the predetermined period is smaller than the threshold, the determination unit 322 determines that the irradiation light is sunlight. In this way, it is possible to accurately determine whether the irradiation light is sunlight. The predetermined period and the threshold described above are set in advance in the solar power generation control device 32, for example. The amount of change in the intensity of the irradiation light in the predetermined period can be obtained, for example, based on a difference between a maximum value and a minimum value of the intensity in this period.

In addition, for example, the acquisition unit 321 may acquire information indicating the solar cell panel 10, in which power generation by the irradiation light is being performed, as the information for specifying the characteristics of the irradiation light. In this case, the determination unit 322 may determine that the irradiation light is sunlight when a specific solar cell panel 10 is performing power generation. Here, the specific solar cell panel 10 is, for example, the solar cell panel 10a arranged on the upper side of the solar cell panel 10b and the solar cell panel 10c.

That is, when the solar cell panel 10a does not generate power even if the solar cell panel 10b or the solar cell panel 10c generates power, there is a high possibility that a position of a light source of the irradiation light is low, that is, the irradiation light is artificial light. On the other hand, when the solar cell panel 10a generates power, there is a high possibility that the position of the light source of the irradiation light is high, that is, the irradiation light is sunlight. Accordingly, the determination unit 322 determines that the irradiation light is sunlight when the solar cell panel 10a is performing power generation. In this way, it is possible to accurately determine whether the irradiation light is sunlight.

In addition, when the plurality of solar cell panels 10 (specifically, the plurality of solar cell panels 10 including the solar cell panel 10a) is performing power generation, the determination unit 322 may determine that the irradiation light is sunlight. That is, it is considered that an irradiation range of the irradiation light (a range in which the light is applied) is wider in a case where the irradiation light is sunlight than in a case where the irradiation light is artificial light. This is because the sunlight includes direct light and scattered light, whereas the artificial light substantially do not include scattered light. That is, when the irradiation range of the irradiation light is narrow such that only one solar cell panel 10 is performing power generation, there is a high possibility that the irradiation light is artificial light. Accordingly, when the plurality of solar cell panels 10 are performing power generation, that is, when the irradiation range of the irradiation light is wide, the determination unit 322 determines that the irradiation light is sunlight, and thus it is possible to accurately determine whether the irradiation light is sunlight.

In addition, for example, the acquisition unit 321 may acquire information indicating a spectrum of the irradiation light as the information for specifying the characteristics of the irradiation light. In this case, when no deviation is present in the spectrum of the irradiation light, the determination unit 322 may determine that the irradiation light is sunlight.

That is, the sunlight includes light of a continuous and wide wavelength component. On the other hand, as compared with that of sunlight, light included in artificial light tends to deviate to a specific wavelength. Accordingly, when no deviation is present in the spectrum of the irradiation light, the determination unit 322 determines that the irradiation light is sunlight, and thus it is possible to accurately determine whether the irradiation light is sunlight. In this case, master data that defines a condition for the determination unit 322 to determine that no deviation is present in the spectrum of the irradiation light is stored in advance in the solar power generation control device 32, for example.

The operation mode control unit 323 controls the operation mode of the solar power generation system 2 based on a determination result of the determination unit 322. For example, in a case where irradiation light is present and the irradiation light is determined to be sunlight by the determination unit 322 while the solar power generation system 2 is in the pause mode, the operation mode control unit 323 sets the solar power generation system 2 to the startup mode.

On the other hand, in a case where no irradiation light is present or even if irradiation light is present, the irradiation light is determined to be artificial light (not sunlight) by the determination unit 322 while the solar power generation system 2 is in the pause mode, the operation mode control unit 323 maintains the solar power generation system 2 in the pause mode as it is. Note that the operation mode control unit 323 may control the operation mode of the solar power generation system 2 by controlling the electric power adjustment device 31 as described above, for example.

If the solar power generation system 2 is set to the startup mode based only on presence of the irradiation light to the vehicle 1, it may occur that the solar power generation system 2 is set to the startup mode even when the irradiation light is artificial light. Therefore, even in a case where the irradiation light is artificial light whose irradiation state is likely to change and of which sufficient generated electric power by the solar cell panel 10 cannot be expected, it may occur that the operation mode of the solar power generation system 2 is set to the startup mode and the power consumption of the solar power generation system 2 increases.

In contrast, the solar power generation control device 32 sets the operation mode of the solar power generation system 2 to the startup mode when the determination unit 322 determines that the irradiation light is sunlight, and does not set the operation mode of the solar power generation system 2 to the startup mode when the determination unit 322 determines that the irradiation light is artificial light (not sunlight). Accordingly, according to the solar power generation control device 32, the solar power generation system 2 can be set to the startup mode in a situation where sufficient generated electric power of the solar cell panel 10 can be expected, and the battery 50 can be appropriately charged with the electric power generated by the solar cell panel 10 while reducing the power consumption of the solar power generation system 2.

In addition, the solar power generation control device 32 may further include a prediction unit 324. The operation mode control unit 323 may set the solar power generation system 2 to the startup mode when the prediction unit 324 predicts that gain electric power of the solar power generation system 2 is greater than 0 (zero). Here, the gain electric power of the solar power generation system 2 can be obtained based on a difference between electric power generated by the solar cell panel 10 and power consumption of the solar power generation system 2 in a case where the battery 50 is charged with the electric power generated by the solar cell panel 10.

Specifically, for example, a sum of the electric power generated by the solar cell panels 10 when the solar power generation system 2 is set to the startup mode is set as Pa, and power consumption of the solar power generation system 2 at the time when the solar power generation system 2 is set to the startup mode is set as Pb. In this case, the prediction unit 324 predicts Pa-Pb as the gain electric power of the solar power generation system 2. The electric power generated by the solar cell panel 10 can be obtained based on an output of the solar cell sensor unit 11. Information indicating the power consumption of the solar power generation system 2 at the time when the solar power generation system 2 is set to the startup mode is stored in advance in the solar power generation control device 32, for example.

Each of functional parts of the solar power generation control device 32 described above can be implemented by, for example, a central processing unit (CPU) executing a predetermined program (software). A part or all of the functional parts of the solar power generation control device 32 may be implemented with hardware such as large scale integration (LSI), an application specific integrated circuit (ASIC), a field-programmable gate array (FPGA), or a graphics processing unit (GPU), or may be implemented by cooperation of software and hardware.

Next, an example of control processing of the solar power generation system 2 performed by the solar power generation control device 32 will be described with reference to FIG. 4. For example, when the operation mode of the solar power generation system 2 is in the pause mode, the solar power generation control device 32 performs the control processing illustrated in FIG. 4.

Figure 4:
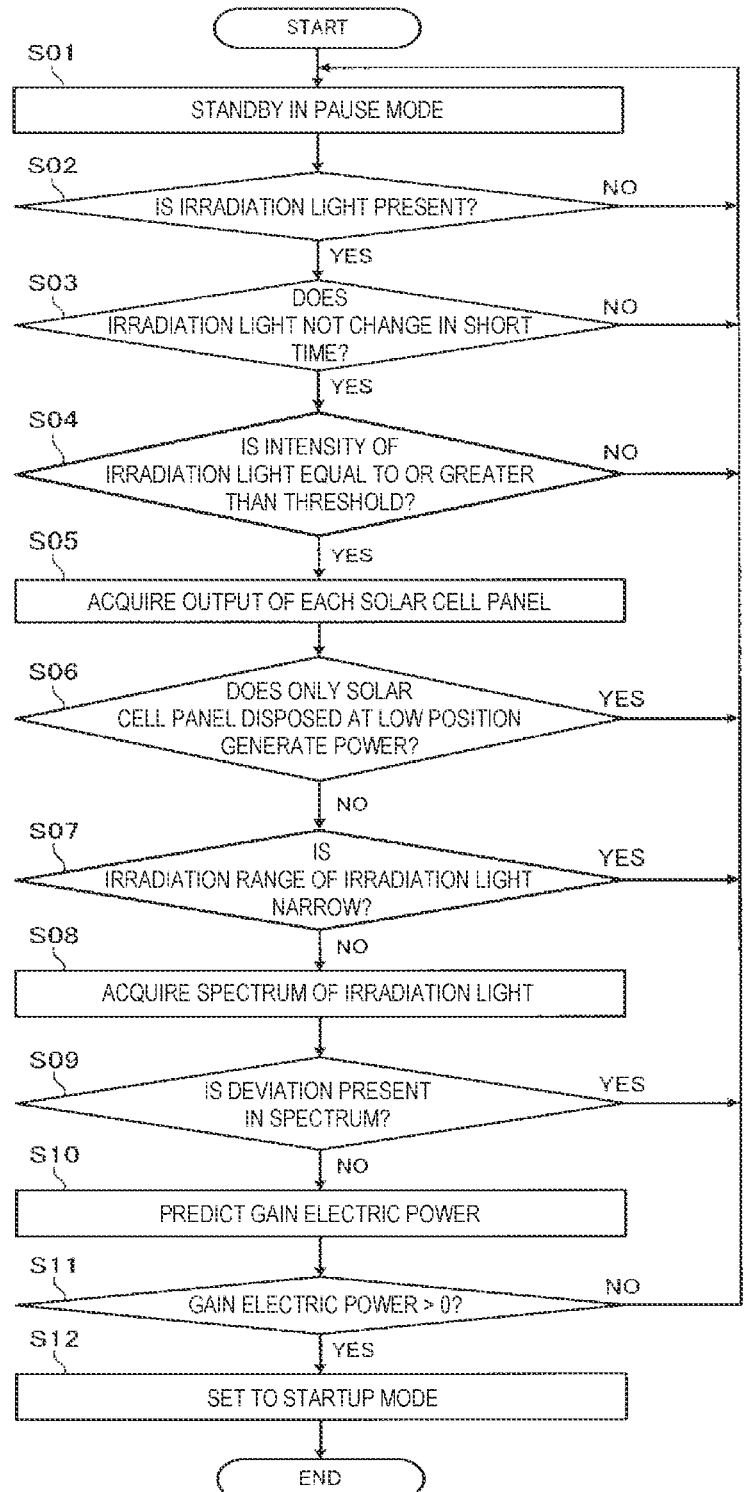
FIG. 4 is a flowchart illustrating an example of control processing performed by the solar power generation control device of the present embodiment.

As illustrated in FIG. 4, first, the solar power generation control device 32 causes the solar power generation system 2 to standby in the pause mode (step S01), and at a predetermined timing determines whether irradiation light is present (step S02). In step S02, for example, the solar power generation control device 32 determines that irradiation light is present when light is detected by the optical sensor unit 20. When it is determined that no irradiation light is present (NO in step S02), the solar power generation control device 32 shifts the process to the processing of step S01.

On the other hand, when it is determined that irradiation light is present (YES in step S02), the solar power generation control device 32 determines whether the irradiation light does not change in a short time (step S03). In step S03, for example, as described above, the solar power generation control device 32 determines whether an amount of change in an intensity of the irradiation light (for example, the light detected by the optical sensor unit 20) in a predetermined period is smaller than a threshold. Then, when the amount of change in the intensity of the irradiation light in the predetermined period is not smaller than the threshold (that is, if the amount of change is equal to or greater than the threshold), the solar power generation control device 32 determines that the irradiation light is changed in a short time (NO in step S03), and shifts the process to the processing of step S01.

On the other hand, when the amount of change in the intensity of the irradiation light in the predetermined period is smaller than the threshold, the solar power generation control device 32 determines that the irradiation light does not change in a short time (YES in step S03), and determines whether the intensity of the irradiation light (for example, the light detected by the optical sensor unit 20) is equal to or greater than a predetermined threshold (step S04). The threshold is determined in consideration of, for example, a minimum value of the intensity of light that allows the solar cell panel 10 to generate power, and is set in advance in the solar power generation control device 32.

When it is determined that the intensity of the irradiation light is less than the threshold (NO in step S04), the solar power generation control device 32 shifts the process to the processing of step S01. On the other hand, when it is determined that the intensity of the irradiation light is equal to or greater than the threshold (YES in step S04), the solar power generation control device 32 acquires information indicating an output of each solar cell panel 10 based on a detection signal of the solar cell sensor unit 11 (step S05).

Next, based on the information indicating the output of each solar cell panel 10 and acquired in step S05, the solar power generation control device 32 determines whether only the solar cell panel 10 arranged at a low position is performing power generation (step S06). In step S06, for example, as described above, the solar power generation control device 32 determines whether the solar cell panel 10a (solar cell panel 10 arranged at a high position) is not included in the solar cell panel 10 that is performing power generation. When the solar cell panel 10a is not included in the solar cell panel 10 that is performing power generation, the solar power generation control device 32 determines that only the solar cell panel 10 arranged at a low position is performing power generation (YES in step S06), and shifts the process to the processing of step S01.

On the other hand, when the solar cell panel 10a is included in the solar cell panel 10 that is performing power generation, the solar power generation control device 32 determines that the solar cell panel 10 arranged at a high position is performing power generation (NO in step S06), and shifts the process to processing of step S07.

Next, based on the information indicating the output of each solar cell panel 10 and acquired in step S05, the solar power generation control device 32 determines whether an irradiation range of the irradiation light is narrow (step S07). In step S07, for example, the solar power generation control device 32 determines whether one or a plurality of the solar cell panels 10 is performing power generation. If there is only one solar cell panel 10 that is performing power generation, the solar power generation control device 32 determines that the irradiation range of the irradiation light is narrow (YES in step S07), and shifts the process to the processing of step S01. On the other hand, if there are a plurality of solar cell panels 10 that are performing power generation, the solar power generation control device 32 determines that the irradiation range of the irradiation light is wide (NO in step S07), and shifts the process to processing of step S08.

Next, the solar power generation control device 32 acquires information indicating a spectrum of the irradiation light based on a detection signal of the optical sensor unit 20 (step S08), and determines whether deviation is present in the acquired spectrum of the irradiation light (step S09). When deviation is present in the spectrum of the irradiation light (YES in step S09), the solar power generation control device 32 shifts the process to the processing of step S01.

On the other hand, when no deviation is present in the spectrum of the irradiation light (NO in step S09), the solar power generation control device 32 predicts gain electric power in a case where the solar power generation system 2 is set to the startup mode, based on the output of each solar cell panel 10 acquired from step S05 and power consumption of the solar power generation system 2 (step S10).

Next, the solar power generation control device 32 determines whether the gain electric power predicted in step S10 is greater than 0 (zero) (step S11), and when the gain electric power is greater than 0 (zero) (YES in step S11), sets the operation mode of the solar power generation system 2 to the startup mode (step S12), and ends the processing illustrated in FIG. 4. On the other hand, if the gain electric power is equal to or less than 0 (zero) (NO in step S11), the solar power generation control device 32 shifts the process to the processing of step S01.

As described above, according to the solar power generation control device 32, the battery 50 can be appropriately charged with the electric power generated by the solar cell panel 10 while reducing the power consumption of the solar power generation system 2.

The present invention is not limited to the embodiment described above, and modifications, improvements, or the like can be made as appropriate.

For example, in the embodiment described above, the vehicle 1 is described as an electric vehicle, and alternatively the vehicle 1 may be a hybrid electric vehicle or a fuel-cell vehicle (fuel vehicle).

At least the following matters are described in the present description. Components and the like corresponding to the above-described embodiment are shown in parentheses, but the present invention is not limited thereto.

(1) A solar power generation control device (solar power generation control device 32) that controls a solar power generation system (solar power generation system 2) capable of charging a power storage device (battery 50) of a vehicle with electric power generated by a solar cell (solar cell panel 10) provided in the vehicle, an operation mode of the solar power generation system including:

a first mode (startup mode) in which the power storage device is charged with electric power generated by the solar cell; and a second mode (pause mode) in which power consumption of the solar power generation system is lower than in the first mode, the solar power generation control device including:

a determination unit (determination unit 322) that determines whether irradiation light to the vehicle is sunlight based on an output of an optical sensor provided in the vehicle; and a control unit (operation mode control unit 323) that controls the operation mode of the solar power generation system based on a determination result of the determination unit, in which the control unit sets the solar power generation system to the first mode when the determination unit determines that the irradiation light is sunlight.

According to (1), since the solar power generation system is set to the first mode when the determination unit determines that the irradiation light to the vehicle is sunlight, the solar power generation system can be set to the first mode in a situation where sufficient generated electric power can be expected, and the power storage device can be appropriately charged with the electric power generated by the solar cell while reducing the power consumption of the solar power generation system.

(2) The solar power generation control device according to (1), in which the optical sensor detects an intensity of the irradiation light, and in which when an amount of change in the intensity of the irradiation light in a predetermined period is smaller than a threshold, the determination unit determines that the irradiation light is sunlight.

According to (2), since it is determined that the irradiation light is sunlight when the amount of change in the intensity of the irradiation light in the predetermined period is smaller than the threshold, it is possible to accurately determine whether the irradiation light is sunlight.

(3) The solar power generation control device according to (1), in which the solar cell includes a first solar cell (solar cell panel 10a) and a second solar cell (solar cell panel 10b, solar cell panel 10c) arranged on a lower side of the first solar cell in an up-down direction of the vehicle, in which the optical sensor is the first solar cell and the second solar cell, and in which when at least the first solar cell performs power generation, the determination unit determines that the irradiation light is sunlight.

According to (3), since it is determined that the irradiation light is sunlight when the first solar cell arranged on an upper side in the up-down direction of the vehicle performs power generation, it is possible to accurately determine whether the irradiation light is sunlight.

(4) The solar power generation control device according to (3), in which when the first solar cell and the second solar cell perform power generation, the determination unit determines that the irradiation light is sunlight.

According to (4), since it is determined that the irradiation light is sunlight when the first solar cell and the second solar cell arranged at different positions perform power generation, it is possible to accurately determine whether the irradiation light is sunlight.

(5) The solar power generation control device according to (1), in which the optical sensor detects a spectrum of the irradiation light, and in which the determination unit determines whether the irradiation light is sunlight based on the spectrum of the irradiation light.

According to (5), since whether the irradiation light is sunlight is determined based on the spectrum of the irradiation light, it is possible to accurately determine whether the irradiation light is sunlight.

(6) The solar power generation control device according to any one of (1) to (5), further including:

a prediction unit (prediction unit 324) that predicts gain electric power of the solar power generation system in a case of charging the power storage device with electric power generated by the solar cell, based on the electric power generated by the solar cell and power consumption of the solar power generation system in the case of charging the power storage device with the electric power generated by the solar cell, in which when it is determined that the irradiation light is sunlight and the prediction unit predicts that the gain electric power is positive, the control unit sets the solar power generation system to the first mode.

According to (6), based on the electric power generated by the solar cell and the power consumption of the solar power generation system in the case of charging the power storage device with the electric power generated by the solar cell, the gain electric power of the solar power generation system in the case of charging the power storage device with the electric power generated by the solar cell is predicted, and when it is determined that the irradiation light is sunlight and the gain electric power is predicted to be positive, the solar power generation system is set to the first mode. Thus the solar power generation system can be set to the first mode in a situation where sufficient generated electric power can be expected, and the power storage device can be appropriately charged with the electric power generated by the solar cell while reducing the power consumption of the solar power generation system.

The invention claimed is:

1. A solar power generation control device, controlling a solar power generation system configured to charge a power storage device of a vehicle with electric power generated by a solar cell provided in the vehicle, an operation mode of the solar power generation system including:

a first mode in which the power storage device is charged with electric power generated by the solar cell; and a second mode in which the power storage device is not charged with the electric power generated by the solar cell, the solar power generation control device comprising:

a determination unit configured to determine whether irradiation light to the vehicle is sunlight or artificial light based on an output of an optical sensor provided in the vehicle; and a control unit configured to control the operation mode of the solar power generation system based on a determination result of the determination unit, wherein the control unit sets the solar power generation system to the first mode when the determination unit determines that the irradiation light is sunlight, and the control unit sets the solar power generation system to the second mode when the determination unit determines that the irradiation light is artificial light.

2. The solar power generation control device according to claim 1, wherein the optical sensor detects an intensity of the irradiation light, and wherein when an amount of change in the intensity of the irradiation light in a predetermined period is smaller than a threshold, the determination unit determines that the irradiation light is sunlight.

3. The solar power generation control device according to claim 1, wherein the solar cell includes a first solar cell and a second solar cell arranged on a lower side of the first solar cell in an up-down direction of the vehicle, wherein the optical sensor is the first solar cell and the second solar cell, and wherein when at least the first solar cell performs power generation, the determination unit determines that the irradiation light is sunlight.

4. The solar power generation control device according to claim 3, wherein when the first solar cell and the second solar cell perform power generation, the determination unit determines that the irradiation light is sunlight.

5. The solar power generation control device according to claim 1, wherein the optical sensor detects a spectrum of the irradiation light, and wherein the determination unit determines whether the irradiation light is sunlight based on the spectrum of the irradiation light.

6. The solar power generation control device according to claim 1, further comprising:
- a prediction unit that predicts gain electric power of the solar power generation system in a case of charging the power storage device with electric power generated by the solar cell, based on the electric power generated by the solar cell and power consumption of the solar power generation system in the case of charging the power storage device with the electric power generated by the solar cell,
- wherein when it is determined that the irradiation light is sunlight and the prediction unit predicts that the gain electric power is at least larger than 0, the control unit sets the solar power generation system to the first mode.

* * * * *